United States Patent [19]

Matoba

[11] Patent Number: 4,901,602
[45] Date of Patent: Feb. 20, 1990

[54] PLANETARY GEAR ASSEMBLY FOR A PLANETARY TRANSMISSION

[75] Inventor: Hideyasu Matoba, Osaka, Japan
[73] Assignee: Matex Co., Ltd., Osaka, Japan
[21] Appl. No.: 641,655
[22] Filed: Aug. 17, 1984
[30] Foreign Application Priority Data
  Mar. 22, 1984 [JP] Japan .................. 59-55500
[51] Int. Cl.$^4$ .................... F16H 1/28; F16H 13/06
[52] U.S. Cl. ................... 415/335; 475/331; 475/344; 475/345
[58] Field of Search ................... 74/801, 798
[56] References Cited

U.S. PATENT DOCUMENTS

| | | | |
|---|---|---|---|
| 1,425,430 | 8/1922 | Wikander | 74/801 |
| 1,586,309 | 5/1926 | Hult | 74/801 |
| 1,970,251 | 8/1934 | Rossman | 74/801 |
| 3,293,928 | 12/1966 | Heister | 74/64 |
| 3,548,679 | 12/1970 | Woodford | 74/705 X |
| 3,583,252 | 6/1971 | Shipitalo | 74/801 X |
| 3,789,700 | 2/1974 | Cotreau et al. | 74/801 |
| 4,468,985 | 9/1984 | Nilsson | 74/798 X |

FOREIGN PATENT DOCUMENTS

| | | | |
|---|---|---|---|
| 236736 | 7/1911 | Fed. Rep. of Germany | 74/801 |
| 30-16918 | 2/1955 | Japan . | |
| 35-17538 | 7/1960 | Japan . | |
| 36-22661 | 11/1961 | Japan . | |
| 44-25692 | 10/1969 | Japan . | |
| 54-17111 | 6/1979 | Japan . | |
| 0163352 | 12/1980 | Japan | 74/801 |
| 0127145 | 8/1982 | Japan | 74/801 |
| 0127146 | 8/1982 | Japan | 74/801 |
| 0017244 | 2/1983 | Japan | 74/801 |
| 0094656 | 6/1983 | Japan | 74/801 |

OTHER PUBLICATIONS

"Machine Design", Dentshman et al., pp. 152, 156, 170, MacMillan, 1975.

*Primary Examiner*—Leslie Braun
*Assistant Examiner*—Dirk Wright

[57] ABSTRACT

A planetary gear assembly is disclosed for a planetary gear transmission which also includes a sun gear and a casing. The planetary gear assembly is comprised of a ring-shaped planetary ring gear (7) and two planetary discs (6) supporting the planetary ring gear (7). Each planetary disc (6) has an outer thrust projection (17) and an inwardly projecting boss (18). The inwardly projecting bosses (18) support the inner surface of the planetary ring gear (7). The thrust projections (17) have a greater diameter than the tooth-edge circle of the planetary ring gear 7. A planetary shaft extends through planetary shaft hole (19) of the planetary discs (6) and is fixed by a carrier (4) at both ends. A unitary outer, inner-toothed ring gear (3) has an inner ring gear portion (8) and two outer cylindrical extension portions (9). The outer cylindrical extension portions (9) have a smaller diameter than the tooth-root circle of the outer ring gear portion (8). A unitary sun gear (1) has an inner sun gear portion (26) and two outer sun gear boss portions (27). The diameter of the outer surface of the sun gear boss portion (27) is smaller than the diameter of the tooth-root circle of the sun gear portion (26). The outer surfaces (20) of the thrust projections (17) of the planetary discs (6) roll on the outer surfaces (28) of the sun gear boss portions (27) as well as on the inner surfaces (21) of the outer cylindrical extension portions (9) of the outer, inner-toothed ring gear (3).

8 Claims, 5 Drawing Sheets

PLANETARY GEAR ASSEMBLY FOR A PLANETARY TRANSMISSION

BACKGROUND OF THE INVENTION

The invention relates to a planetary transmission employing planetary gear assemblies which incorporate discs. More specifically, the invention relates to a novel planetary gear assembly and a planetary transmission employing the novel gear assembly.

A planetary transmission may be used to provide rotation of an output shaft which is different from the rotation of an input shaft. One type of planetary transmission employs rigid and precisely engaged gears, but costs for this type of transmission are relatively high. In another type of planetary transmission, loosely engaged gears are employed, but their use is accompanied by considerable undesirable noise and vibration and concomitant low efficiency of power transmission.

Designs for planetary transmissions employing loosely engaged teeth have been developed in an effort to reduce noise and vibration. In one design, discs are placed on both sides of the planetary gear and on the same shaft as the planetary gear.

U.S. Pat. No. 3,293,928, published Dec. 27, 1966, discloses a torque convertor which includes planetary gear assemblies having a planetary ring gear sandwiched between two planetary discs. The disc diameters are equal to the diameter of the pitch circle of the gears.

U.S. Pat. No. 3,548,679 published Dec. 22, 1970, describes a toothed gear system and a bevel gear system with friction gears whose diameters are equal to those of the pitch circle on the side of each gear. The friction gears transmit power radially and eliminate backlash.

Japanese Model Publication No. 16,918/55 describes a planetary gear system in which extreme accuracy in fitting parts together is not necessary. A roller is set on one side of the planetary gear, and a cylindrical pipe is set on side of the ring gear. The roller and pipe have diameters equal to the pitch circles of the gears. The rollers and pipes eliminate problems resulting from inaccuracies in size. The rollers are mounted on the same shaft as the planetary gears but apart from them. The rollers and the pipes receives radial pressure and provide smooth revolution. However, because the rollers are mounted on the same shaft as the planetary gears and set apart from them, the shafts must be long making the entire system very bulky.

In Japanese Utility Model Publication No. 25,692/69 another technique is disclosed for overcoming disadvantages in planetary gear systems. Here, the planetary gears are made of elastic material, namely rubber. Elastic gears, however, impose limitations on the transmission. The torque allowable in an elastic gear system is relatively low, and continuous expansion and contraction of rubber parts produce heat and accelerate the deterioration of the elastic material.

Another method for overcoming difficulties in planetary transmissions is disclosed in Japanese Utility Model Publication No. 17,588/60 and Japanese Patent Publication No. 22,661/61. An intermediate ring is placed between a planetary gear ring and the planetary shaft, and a clearance is provided between the intermediate ring and the planetary gear ring so that the planetary gear ring can slightly change its relative position in relation to the planetary shaft and compensate for inaccuracies in gear dimensions. In this type of device, pitch discs or pitch rings are not necessary. A difficulty associated with the transmission of this type is that transmitted power is not evenly distributed to the gear teeth. If the sun gear or the carrier were movable radially, the center of the shaft would move to compensate for inaccuracies in engagement. However, in many instances, this is not the case. Therefore, a transmission of this type does not average transmission torque. Because of this disadvantage, this technique is even less suitable than the elastic gear device.

In Japanese Patent Publication No. 17,111/79 published June 27, 1979, a planetary transmission is disclosed having features employing both the pitch disc technique and the elastic gear method. A planetary gear is placed loosely between two pitch discs rotatably mounted on planetary gear shafts supported by a carrier plate fixed on an output shaft. The outer diameters of the pitch discs are equal to those of the pitch circles of both the planetary gear and the outer pitch rings fixed to a case. The outer diameter of the pitch discs is also equal to that of the pitch circle of the ring gear. The pitch discs of the planetary gears contact and roll on the pitch rings of the outer, inner-toothed gear. Because of rolling contact, the contact between the disc and ring transmit no torque. But the contact transmits pressure face-to-face.

A planetary transmission employing discs having pitch circle diameters is disclosed in copending U.S. application Ser. No. 513,207, filed July 12, 1983 by the present inventor.

In a planetary transmission, the sun gear and the carrier are connected to input and output shafts in order to transmit rotation. However, the planetary gears are freely turning wheels which have neither input nor output shafts nor corresponding shaft bearings. Therefore the planetary gears can move in a radial direction during operation. When planetary gears deviate from their ordinary position during operation, they often engage other gears with an abnormally strong force. Such rough engagement brings about excessive noise and wear and tear on the gears.

Another source of abnormal wear and tear on the gears and abnormally loud noise during operation is when the teeth of one gear tend to adhere to the teeth of another gear. When this teeth interference occurs, an excessively strong force is required to rotate the interfering gears.

For these reasons planetary gear assemblies tend to generate excessive noise and tend to operate at unexpectedly low torque transmission efficiency.

If the accuracy of finishing the gear teeth is raised, the pressures at all tooth engagement points should become equivalent, and the gears and carrier should rotate smoothly and with even force. However, slight inaccuracies between gears is inevitable, and gears cannot compensate for the inequalities of pressures.

One way to improve the accuracy of gear finishing in order to avoid the inequality of gear pressure would be to control the limit of inaccuracy to be less than several microns. However, such a technique would be very expensive because the cost of grinding a tooth is considerably high, and the whole cost of grinding an entire gear is proportional to the number of teeth.

In the pitch circle disc method referred to above, the pitch discs of the planetary gears contact and roll on the pitch rings of the outer, inner-toothed gear. Because of rolling contact, the contact between the disc and the ring transmit no torque, but the rolling contact does transmit pressure face-to-face. Deep teeth interference is prevented by the contact between the pitch circle disc and the pitch circle ring.

Yet another apparatus designed to eliminate pressure differences at gear engagement points is a planetary gear assembly disclosed in copending U.S. patent application Ser. No. 523,919 filed Aug. 16, 1983 by the present inventor in which a planetary tranmission is disclosed having planetary ring gears sandwiched between front and back thrust discs and having an outer, inner-toothed annular ring gear sandwiched between front and back thrust rings. The thrust disc outer diameter is equal to or preferably greater than the planetary ring gear tooth-tip circle diameter. The thrust ring inner diameter is equal to or preferably greater than the tooth-bottom circle diameter of the outer, inner-toothed ring gear.

When a planetary gear with a pitch-circle disc is seen for a side view, half the gear teeth stubs are visible; that is, one module of teeth project outward from the disc. When a planetary gear with a tooth-edge-circle disc is seen from a side view, no portion of the gear teeth appears.

The planetary gear assembly having tooth-edge-discs have several advantages over a planetary gear assembly having pitch-circle discs. One advantage of the tooth-edge-disc assembly is that it is strongly resistant to axial thrust during operation of the transmission. Thrust is generated by a relative axial displacement of the sun gear shaft and the carrier shaft during operation of the transmission.

In the pitch-circle-disc type of planetary gear assembly, only half of the gear teeth tops, namely one module of teeth, are held between adjacent gears. Under excessive thrust, the gear teeth tops interfere with one another. In contrast, with the tooth-edge-disc planetary gear assembly described in U.S. Ser. No. 523,919, the entire length of the gear tooth tops, namely more than two modules, are sandwiched between two discs. Because a total area of the teeth sides is protected by thrust discs and because the total area of the teeth sides for sustaining thrust is relatively large, even if continuous thrust acts on the gears, the gears are protected from defacement and transmission efficiency does not decrease.

The tooth-edge-disc planetary gear assembly is comprised of fewer components than the pitch-circle-disc type of planetary gear assembly. This aspect is very important because an assembly having fewer parts to assemble is easier to mass-produce.

To manufacture a pitch-circle-disc planetary gear assembly, three or four planetary gears are supported by planetary shafts fixed on one carrier plate along with a sun gear and an outer, inner-toothed ring gear An-other carrier plate is fixed to the planetary shafts, and these components are made up into a planetary transmission. Two outer pitch-circle rings are separate components. These outer pitch circle rings are mounted on the inner-toothed ring gear by screws for installing the assembly into a casing. Thus, with the pitch-circle-disc type of planetary transmission, both the planetary gear assembly and the outer, inner-toothed ring gear assembly require three components. No single component is satisfactory for producing an individual gear.

Many efforts have been made to solve the problems of teeth interference in planetary gear transmissions. In efforts to make improvements thus far, the components focused upon for improvement have been the outer, inner-toothed ring gear and the planetary gear assemblies. Improvements are easily brought about upon planetary gears because they are freely rotating, do not transmit torque, and are not attached to shafts. To solve the problem of the discrepancy of forces acting on a plurality of planetary gears, improvements in the structure of the planetary gears has been most effective Generally, a planetary gear assembly and an outer, inner-toothed ring gear are fixed to a casing, and a sun gear or a carrier is connected to either an input shaft or an output shaft. When used for deceleration, the sun gear is attached to an input shaft. For use in acceleration, the carrier is attached to the input shaft.

The center lines of the input shaft and the output shaft should lie along the same axial line. In addition, the center line of the outer, inner-toothed ring gear must also coincide with the center line of the input and output shafts. These are general requirements for mounting a planetary gear transmission assembly in a casing.

In many cases an input shaft is connected to a motor at one end and is supported by a bearing at an intermediate location. The output shaft is connected with a load at one end and supported by one or more bearings at an intermediate location.

However, the casing for securing the assembly is not always manufactured with high accuracy. In the instance of a plastic casing, considerable errors may occur in the sizes of the molded casings.

When the center lines of the input shaft, the output shaft, and the outer, inner-toothed ring gear do not coincide, the sun gear and the carrier vibrate in a radial direction, and the carrier inclines out of normal position. In such a case, significant teeth interference occurs between the sun gear and the planetary gears. The teeth interference generates considerable noise and significantly reduces transmission operating efficiency.

It is well known in the prior art that gears which have side discs are protected from radial forces. However, the prior art discloses pitch-circle discs only. Thus, a sun gear or an outer, inner-toothed ring gear, in accordance with the prior art, must be composed of three components in order to have pitch-circle discs on both sides.

Furthermore, since both the sun gear and the outer, inner-toothed ring gear transmit torque, unlike toothed ring gear has side discs, then the side discs should be fixed upon the gear part by suitable securing devices such as screws, etc.

Accordingly, it is a primary object of the present invention to provide a planetary transmission having planetary gear assemblies with planetary discs and having a unitary sun gear and a unitary outer, inner-toothed ring gear which engage the planetary discs.

An advantage of the present invention is the provision of a planetary gear transmission in which the number of components is fewer and the assembly cost is less expensive than a transmission of the pitch-circle-disc type.

Another advantage of the present invention is the provision of a planetary gear transmission in which all the gears have either tooth-edge-circle discs or tooth-root-circle discs on both sides for protecting the gears from radial forces.

Another advantage of the present invention is the provision of a planetary gear assembly in which the planetary discs prevent teeth interference between meshing gears.

Another advantage of the present invention is the provision of a planetary gear assembly having planetary discs in which the transmission efficiency is higher than a planetary gear assembly not having planetary discs.

SUMMARY OF THE INVENTION

A planetary gear transmission of the invention is comprised of a plurality of planetary gear assemblies with discs, a unitary sun gear, a unitary outer, inner-toothed ring gear, and a casing.

The planetary gear assembly consists of a ring-shaped planetary gear ring and two planetary discs supporting the planetary gear ring and sandwiching the planetary gear ring therebetween. Each planetary disc has an outer thrust projection and an inwardly projecting boss.

The inwardly projecting bosses of the two planetary discs support the inner surface of the planetary gear ring. The thrust projections of the planetary discs have a greater diameter than the tooth-edge circle of the planetary gear ring. A planetary shaft passes through planetary shaft holes of the planetary discs and is fixed and supported by the carrier at both ends.

The unitary outer, inner-tooth ring gear has a middle ring gear teeth bearing portion and two outer non-teeth bearing cylindrical extension portions. The outer cylindrical extension portions have a smaller diameter than the tooth-root circle of the outer, inner-toothed ring gear teeth bearing portion.

A unitary sun gear has an inner sun gear teeth bearing portion and two outer sun gear boss portions having no gear teeth. The diameter of the outer surface of the non-teeth bearing sun gear boss portions is smaller than the diameter of the tooth-root circle of the sun gear teeth-bearing portion.

The outer surfaces of the thrust projections of the planetary discs are in rolling contact on the outer surfaces of the sun gear boss portions as well as in rolling contact with the inner surfaces of the cylindrical extension portions of the outer, inner-toothed ring gear.

With the invention, a planetary transmission is provided employing a planetary gear assembly with discs wherein both the outer, inner-toothed ring gear and the sun gear are of unitary construction. Thus, less components are required than with previous assemblies employing planetary discs.

Also, the invention, the planetary discs are in rolling contact with both the outer, inner-tooth ring gear and the sun gear below the tooth-root line.

With the invention, teeth interferences are precluded, and noise of operation is significantly reduced.

With the invention, a planetary gear transmission employing planetary discs is provided wherein the need for means for fixing side rings to the outer, inner-toothed ring gear and means for fixing discs to the sides of a sun gear is eliminated.

BRIEF DESCRIPTION OF THE DRAWINGS

The foregoing and other objects, features, and advantages of the invention will be apparent from the more specific description of preferred embodiments of the invention, as illustrated in the accompanying drawings in which reference characters refer to the same parts throughout the different views. The drawings are not necessarily to scale, emphasis instead being placed upon illustrating principles of the invention in a clear manner.

DETAILED DESCRIPTION OF THE PREFERRED EMBODIMENTS

Figure 1:
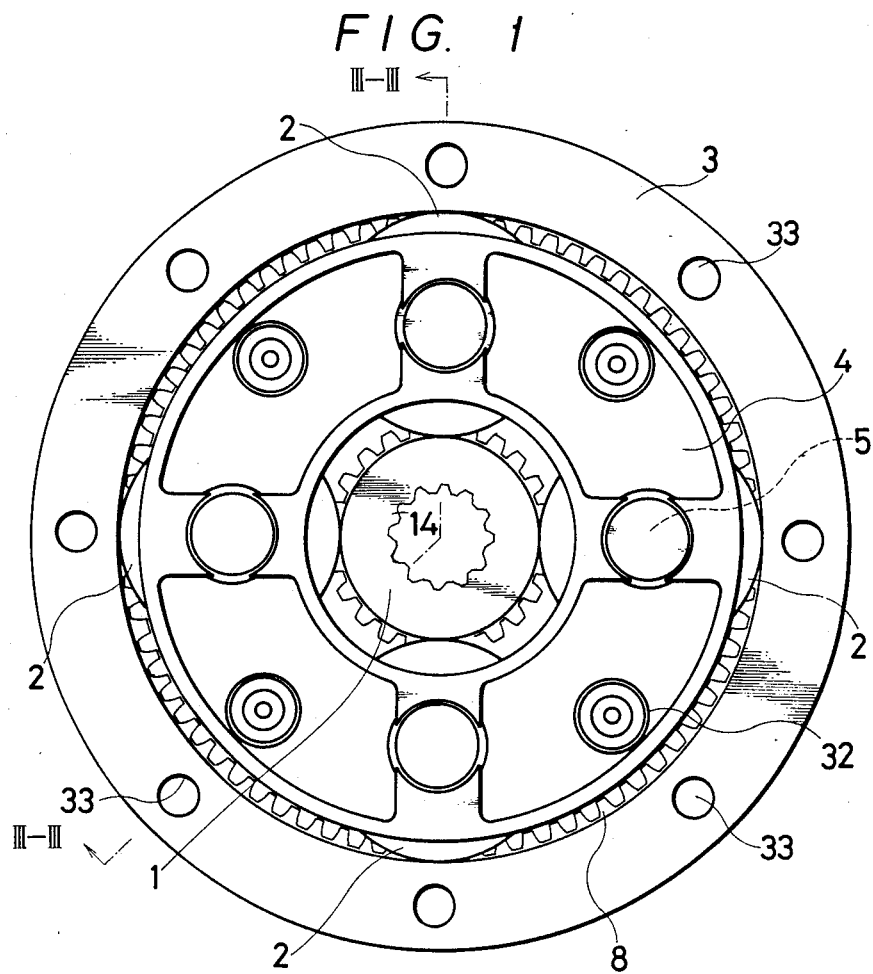
FIG. 1 is a front view of a planetary transmission embodiment of the invention.
Figure 2:
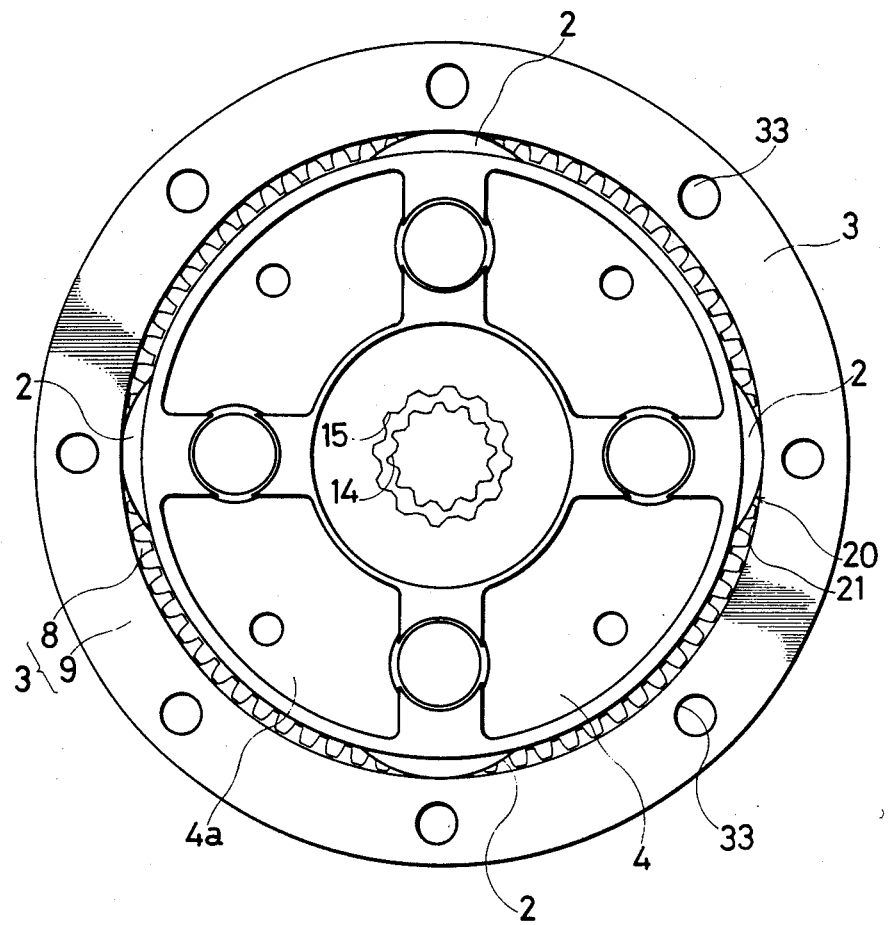
FIG. 2 is a back view of the embodiment of the invention in FIG. 1.

With reference to FIGS. 1 and 2, a planetary gear transmission assembly is comprised of a unitary sun gear 1 at the center, three or four planetary gear assemblies 2 enclosing and engaging the unitary sun gear 1, a unitary outer, inner-toothed ring gear 3 enclosing and engaging with the planetary gear assemblies 2, and a carrier 4 supporting the planetary gear assemblies 2.

Figure 3:
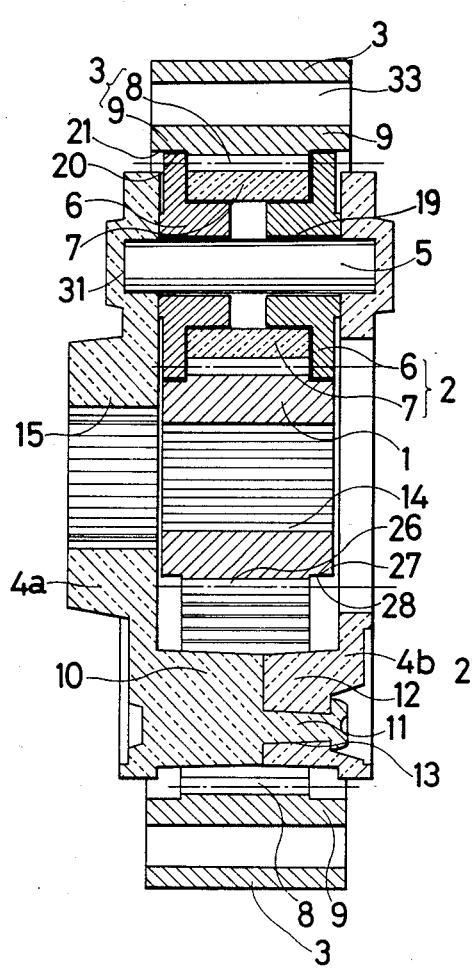
FIG. 3 is a sectional view taken along the line III—III in FIG. 1.
Figure 4:
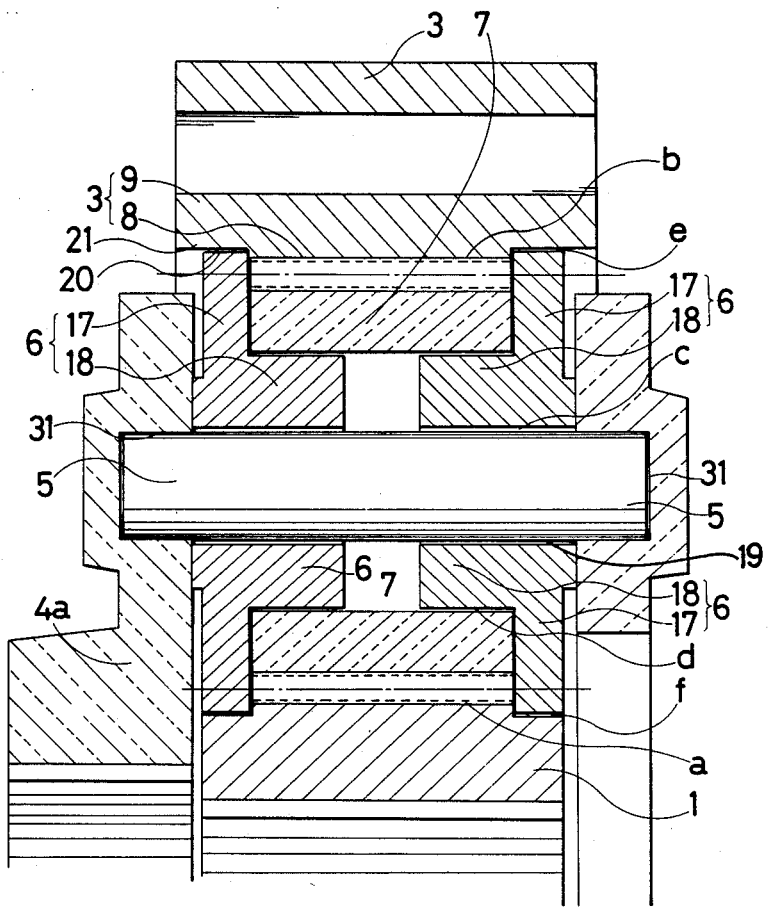
FIG. 4 is an enlarged sectional view of the upper half of shown in FIG. 3.

With reference to FIGS. 3 and 4, a planetary gear assembly 2 is comprised of a ring-shaped planetary gear ring 7 having teeth and two planetary discs 6 which support the planetary gear ring 7. A planetary shaft 5 passes through planetary shaft holes 19 and is fixed at both ends by the carrier 4. As shown in the enlarged sectional view of FIG. 4, the planetary disc 6 includes an inwardly projecting boss 18 extending into the interior of the planetary gear ring 7. Planetary disc 6 also includes an outwardly projecting thrust projection 17 which is greater in diameter than the tooth-edge circle of the planetary gear rings 7.

The unitary outer, inner-toothed ring gear 3 has an inner ring gear portion 8 and two outer cylindrical extension portions 9. The outer cylindrical extension portions 9 have a smaller diameter than the tooth-root circle of the outer ring gear portion 8. The inner surface of the outer cylindrical extension portions 9 is designated as rolling circumference 21.

The planetary gear assemblies 2 and the outer, inner-toothed gear 3 are meshed by the teethbearing planetary gear rings 7 and the outer ring gear 8. As the planetary gear assemblies 2 and the outer, inner-toothed gear 3 are in radial contact, they act as rollers at the planetary rolling circumference 20 and the outer rolling circumference 21. Radial forces are transmitted by the planetary rolling circumference 20 and the outer rolling circumference 21 in view of the fact that they contact each other in a radial direction.

The unitary sun gear 1 has an inner sun gear portion 26 having gear teeth and also has two outer sun gear boss portions 27 not having teeth. The diameter of the outer surface of the sun gear boss portion 27 is smaller than the diameter of the tooth-root circle of the sun gear portion 26. The thrust projection circumference surface 20 of the planetary disc 6 is in rolling contact with the sun gear boss portion circumference surface 28. In addition, the outer, inner-toothed ring gear cylindrical extension portion circumference surface 21 is in rolling contact with the thrust projection circumference surface 20.

As discussed above, a planetary gear assembly 2 made in accordance with the invention is comprised of three components: the planetary gear ring 7; and, two planetary dics 6.

In contrast, the outer, inner-toothed ring gear 3 is a unitary structure. That is, it is a one-piece structure and can be made from plastics or sintered alloys and may be produced by a molding process.

The carrier 4 consists of a main carrier disc 4a and a sub-carrier disc 4b. The carrier may be made from plastic, aluminum, or steel. In the case of steel, for example, chromium molybdenum steel, two steel discs are coupled with rivets etc. In the case of plastics, main carrier discs 4a and sub-carrier discs 4b are both produced by injection molding and are coupled to each other.

For aluminum carrier discs 4a and 4b, a die-casting method may be employed.

Complimentary parts 10 and 12 are formed on the inner surfaces of the carrier discs 4a and 4b at the positions in the middle of neighboring planetary shafts 5. Carrier 4a has a body part 10 having a projecting plug portion 11. Sub-carrier 4b has a body part 12 having a socket hole 13. The plug portion 11 is inserted into the socket hole 13, and the end of the plug portion 11 projecting from out of the socket hole 13 is deformed and flattened by an object such as a hammer to secure carrier 4a and sub-carrier 4b together. See FIGS. 1 and 3 which illustrate flattened ends 32 securing carrier discs 4a and 4b together.

The embodiment in FIG. 1 depicts a carrier made from aluminum. Plastic carriers may also be utilized. However, the flattened end 32 of the plug portion 11 may be replaced by supersonic welding or adhesion using a permanent adhesive in the case of plastics. Even a simple snap-fitting is applicable whereby the plug part 11 is held in the socket hole 13 by friction force only.

At the center of the unitary sun gear 1, a sun gear shaft hole 14 extends along an axial direction. The sun shaft hole 14 receives either an output shaft or an input shaft. The sun shaft hole 14 has a spline configuration which prevents the relative rotation of the shaft within the hole.

The unitary sun gear 1 can be made from plastics, sintered alloys, or steel. In the case of plastics, a sun gear having the inner sun gear portion 26 and the two outer sun gear boss portions 27 is produced by an injection molding technique.

In the case of sintered alloy, steel or other metals, a simple spur gear with the tooth widths including the widths of the two outer sun gear boss portions 27 is manufactured first. Then, the teeth on the outer ends of the sun gear are ground down and removed so that two outer sun gear boss portions 27 are formed thereby providing a sun gear rolling circumference 28.

Figure 5:
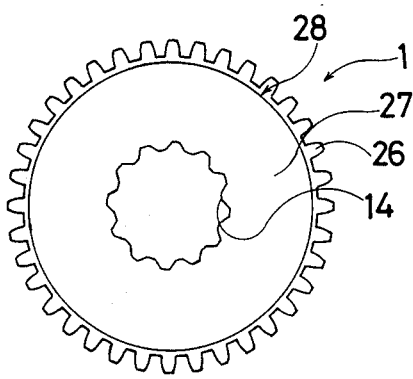
FIG. 5 is a front view of an embodiment of a unitary sun gear made in accordance with the invention.
Figure 6:
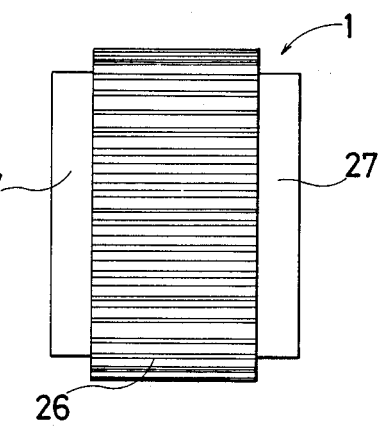
FIG. 6 is a side view of the sun gear in FIG. 5.

FIG. 5 is a side view of an embodiment of a sun gear 1 in accordance with the invention. FIG. 6 is a front view of the sun gear 1 in FIG. 5.

The planetary disc 6 and the planetary gear ring 7 may be made from plastics, sintered alloys, and metals.

The rolling clearance between the outer rolling circumference 21 and the planetary rolling circumference 20 is denoted by e. The rolling clearance between the planetary rolling circumference 20 and the sun gear rolling circumference 28 is denoted by f. The rolling clearances c and d are defined as the diameter of the inner surface minus the diameter of the outer surface. They are equal to the maximum values of satisfactory clearances.

The relation of radial mesh clearances a, b and rolling clearances c, d, e, and f are described. The radial mesh clearances a and b are defined as the radial gap from a tooth top of a gear to a tooth bottom of another gear at the engagement point under the assumed conditions that the planetary shafts 5 are fixed and the planetary discs 6 and the outer cylindrical extension portions 9 are smoothly finished. The rolling clearances between the rolling circumferences are defined under the assumed condition that all the components are maintained at fixed positions.

The radial mesh clearance between the unitary sun gear 1 and planetary gear ring 7 at an engagement point is denoted by a. The radial mesh clearance between the planetary gear ring 7 and the outer, innertoothed 8 ring gear at the engagement point is denoted by b.

The maximum value of the rolling clearance between the planetary disc shaft hole 19 and the planetary shaft 5 is denoted by c. The maximum value of the rolling clearance between the inner surface of the planetary gear ring 7 and the inwardly projecting boss 18 of the planetary disc 6 is denoted by d.

For example, for a gear tooth module equalling 0.75 mm. and for the number of teeth of the sun gear 1, the planetary gear ring 7, and the outer, inner-toothed ring gear 8 being 36, 20, and 76 in number respectively, satisfactory ranges of values for the rolling clearances c and d are:

c=0.05–0.1 mm.
d=0.04–0.1 mm.

In the example, the radial mesh clearance between the sun gear 1 and the planetary gear ring 7 and the radial mesh clearance between the planetary gear 7 and the outer, inner-toothed ring gear 8 are in the range of:

a=0.295–0.245 mm.
b=0.35–0.25 mm.

In the example, the optimum ranges of the rolling clearances are:

e=0.1–0.15 mm.
f=0.1–0.15 mm.

To avoid teeth interference between the planetary gear ring 7 and the outer, inner-toothed rin gear 8, the radial mesh clearance b and the rolling clearances e and d satisfy the inequality:

$$b > e + d. \quad (1)$$

To avoid teeth interference between the sun gear 1 and the planetary gear ring 7, the radial mesh clearance a and the rolling clearances f and d satisfy the inequality:

$$a > f + d. \quad (2)$$

The inequalities (1) and (2) can be regarded as inequalities for determining upper limits of the rolling clearance e between the rolling circumferences and 21 as well as the rolling clearance f between the rolling circumferences 20 and 28.

The thrust projections 17 of the planetary discs 6 is of greater diameter than the tooth-edge circle of the planetary gear ring 7. Optimum range of radial difference between the thrust projection 17 and the tooth-edge circle of gear ring 7 is from 0–2 modules.

The diameter of the outer rolling circumference 21 of the outer cylindrical extension portions 9 is preferably 0–2 modules larger than the diameter of the tooth-edge circle of the outer, inner-toothed ring gear 8.

The diameter of the sun gear rolling circumference 28 is preferably 0–2 modules smaller in diameter than the tooth-root circle of the sun gear 1.

During operation of an embodiment of the invention, the three rolling circumferences 20, 21, and 28 are in their previously described rolling contact even when the sun gear 1 or the planetary discs 6 deviate from their initial positions.

Steps in assembling an exemplary embodiment of the planetary gear transmission assembly of the invention are as follows:

(1) A main carrier disc 4a is placed with the inner surface facing upward on a suitable work frame.

(2) Planetary shafts 5 are pushed into the planetary shaft holes 31.

(3) Planetary discs 6 from one side and planetary gear rings 7 are fitted around the planetary shafts 5.

(4a) An outer, inner-toothed ring gear 3 is placed so that its ring gear teeth 8 are in enagement with the teeth of planetary gear rings 7.

(4b) The sum gear 1 is inserted.

(5) Planetary discs of the other side are fitted around the planetary shafts 5.

(6) A sub-carrier disc 4b is fitted to the main carrier disc 4a. Plug parts 11 are inserted into the socket holes 13.

(7) Finally, tops of the plug parts 11 are pressed so that they are flattened.

Two important features of the present invention are that the outer, inner-toothed ring gear 3 and the sun gear 1 are one-piece structures. Thus, an embodiment of the planetary gear assembly of the invention is comprised of less components than an analogous pitch-circle-disc type assembly. Therefore, the number of steps required to assemble an embodiment of the invention is also fewer than the number of steps required to assemble a pitch-circle-disc type assembly.

A planetary gear assembly embodiment of the invention is installed in a transmission casing. Inserted into the casing are an input shaft and an output shaft (not shown in Figures) which are supported by bearings. The casing has a cylindrical step portion (not shown) for contacting with a side of the outer, inner-toothed gear. On the step portion, 4 to 8 screw holes are bored which correspond to fixation holes 33 perforated on the outer, inner-toothed gear 3. Screws are placed into the fixation holes 33 and loosely driven into the screw holes. There is some gap between the screw and fixation hole 33 in order to allow the planetary gear assembly to move in a plane parallel with the assembly before fastening.

The input shaft and output shaft are inserted into the sun gear shaft hole 14 and the carrier shaft hole 15 respectively. The shapes of the shaft holes 14 and 5 are D-shaped having splines, serrations or other shapes having rotation prevention action. After the shafts are inserted into the shaft holes, the screws are tightened to firmly fix the planetary gear assembly in position.

Advantages obtained by employing the concepts of the invention are numerous. One advantage is that even if a transmission casing that is used has dimensional inaccuracies, planetary gear teeth interference does not occur. After an input shaft and an output shaft are inserted into the shaft holes, the assembly is secured by tightening the screws to the casing. Therefore, even if the input shaft and the output shaft do not lie along the same axial line, which is also the center line of the casing, nevertheless, radial forces are transmitted by the sun gear rolling circumference 28, the planetary rolling circumference 20, and the outer rolling circumference 21.

The rolling contact of the rolling circumferences 28, 20, and 21 provides a small range of radial mesh clearances between meshed gears and prevent overly deep engagement of teeth. As a result of preventing teeth interference, noise generation is reduced and the transmission efficiency of input force improves.

In a comparative test, the planetary gear assembly disclosed in the above-mentioned Japanese patent application laying open number 94656/1983 which does not have a unitary sun gear having outer boss portions generated noises varied in intensity from 55 to 57 decibels. Besides high loudness, the noise level had low frequency variations resulting in an undesirable hum. Under similar test conditions, an embodiment of the planetary gear transmission assembly of the invention produced a sound intensity of 55 decibels, and the noise level did not vary and remained constant.

Another advantage of the invention is the use of the principles of the invention in the examination of gear casings to test for dimensional errors. In an input shaft or an output shaft cannot be inserted into a sun gear shaft hole or a carrier shaft hole of the planetary gear assembly because the planetary gear assembly is loosely retained in the casing, this fact signifies that the casing is excessively large. Such a casing should be rejected. If the material comprising the casing is plastic, size errors may be due to unsatisfactory molding conditions.

Although a planetary gear assembly of the pitch-circle-disc type transmits radial forces between gears and employs rolling circumferences, more components of the pitch-circle-disc type planetary gear assembly are comprised of three components, and many additional components would be required for a complete transmission than would be required with an embodiment of the invention which uses less components and for which assembly would be less expensive.

In further explanation, planetary gears are freely rotating wheels which transmit no torque. Thus, the three components of the planetary gear can move freely without being fixed to each other. On the other hand, a sun gear and an outer, inner-toothed ring gear are not freely rotating wheels. These gears transmit torque between gear and shaft. Therefore, with a pitch-circle-disc planetary gear assembly, either a three-part sun gear (two discs and one sun gear) or a three-part outer, inner toothed ring gear assembly (one ring gear and two outer rings) must be secured to form a unified body. To secure three components into a unified body for the sun gear and the outer, inner-toothed ring gear requires more time, labor, and materials than are required with employing an embodiment of the invention where both the sun gear and the outer, inner-toothed ring gear are unified structures. It is especially difficult to secure two small discs to a small sun gear using several screws when the sun gear is relatively small.

An additional problem would result in fixing two outer rings to an outer, inner-toothed ring gear. It is especially difficult to fabricate an outer, inner-toothed ring gear and ring discs having a congruent center axis. There is a high probability that the gear part and the ring parts will have different centers, and as a result there is a high probability of aberration between the gear part and the ring parts. In contrast, with an embodiment of the invention, there is no problem in having the center of the outer gear part coincide with the center of the ring parts because the entire outer, inner-tooth ring gear is a unified structure produced from a single blank of stock material.

As discussed above, the planetary gear ring 7 is supported by the planetary discs 6. There is a clearance d between the inner surface of the planetary gear ring 7 and the inwardly projecting boss 18 of the planetary disc 6.

Another clearance c exists between the planetary shaft hole 19 and the planetary shaft 5.

Even if the accuracy for determining the positions of the planetary shafts 5 on the carrier 4 is relatively low, all the pressures acting on planetary gear rings 7 are equalized due to the clearances c and d. Because the pressures are equalized, the life of the gears is prolonged.

Figure 7:
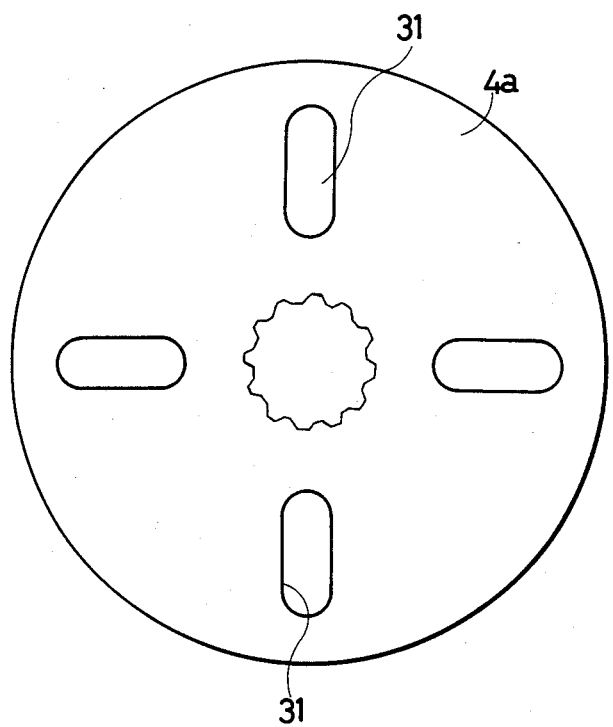
FIG. 7 is a rear view of a main carrier plate having slots for sustaining planetary shafts.

FIG. 7 shows a rear view of another example of the main carrier plate 4a. In this example, planetary shaft holes 31 are elongated grooves. The sub-carrier plate 4b also has similar elongated grooves. The planetary shafts 5 can move in a radial direction. The movement of the planetary shaft automatically equalizes the clearances e and f and makes rotation run more smoothly.

The foregoing description of the novel planetary gear assembly and planetary transmission of the invention has been presented for purposes of illustration and description. It is not intended to be exhaustive or to limit the invention to the precise forms disclosed. Obvious modifications or variations are possible in light of the above teachings. The embodiments were chosen and described in order to best illustrate the principles of the invention and its practical application to thereby enable one of ordinary skill of the art to best utilize the invention in various embodiments and with various modifications as are suited to the particular use contemplated. It is intended that the scope of the invention be defined by the claims appended hereto.

The embodiments of the invention in which an exclusive property of privilege is claimed are defined by the following:

1. A planetary gear transmission, comprising:
    a unitary sun gear having an inner sun gear portion and two outer sun gear boss portions said boss portions being formed with said sun gear as one piece;
    at least one planetary gear assembly comprised of:
        a planetary gear ring meshed with said sun gear;
        two unitary planetary discs having an outer thrust projection in at least intermittent rolling contact with said sun gear boss portions and having an inwardly projecting boss supporting the inner surface of said planetary gear ring and sandwiching said planetary gear ring therebetween; and,
        a planetary shaft for supporting said planetary gear ring and said planetary discs;
    a carrier assembly for receiving said planetary shaft and rotatably supporting said planetary gear assembly;
    an outer, inner-toothed unitary ring gear having an outer ring gear located between two outer cylindrical extension portions, said outer ring gear meshed with said planetary gear ring, and said outer cylindrical extension portions in at least intermittent rolling contact with said thrust projections of said unitary planetary discs, wherein:
        said outer thrust projections of said unitary planetary discs have a greater diameter than the tooth edge circle of said planetary gear ring;
        said sun gear boss portions have smaller diameters than the tooth-root circle of said sun gear;
        said outer cylindrical extension portions have greater diameters than the tooth-root circle of said outer inner-toothed unitary ring gear; and,
        whereby said two unitary planetary discs both serve to restrain said sun gear from axial movement and to restrain said planetary gear ring from radial movement.

2. A planetary gear transmission as described in claim 1 wherein:
    the radii of said thrust projections of said planetary discs are up to 2 modules larger than te radii of the tooth-edge circles of said planetary gear rings;
    the radii of said outer cylindrical extension portions are up to 2 modules larger than the radius of the tooth-root circle of said outer, inner-toothed ring gear; and,
    the radii of said sun gear boss portions are up to 2 modules smaller than the radius of the tooth-root circles of said inner sun gear portion.

3. A planetary gear transmission as describe in claim 2 wherein:
    said unitary sun gear, said planetary gear rings, and said planetary discs are made from sintered alloys;
    said carrier is made from a die-cast aluminum; and,
    said unitary outer, inner-toothed ring gear is made from injection molded plastic.

4. A planetary gear transmission as described in claim 2 wherein said unitary sun gear rings, said carrier, and discs, said planetary gear rings, said carrier, and said unitary outer, inner-toothed ring gear are made from plastic.

5. A planetary gear transmission as described in claim 1 wherein said unitary sun gear, said planetary gear rings, said unitary outer, inner-toothed ring gear, and said carrier are made from metal.

6. A planetary gear transmission as described in claim 1 wherein:
    said unitary sun gear, said planetary gear rings, and said planetary discs are made from sintered alloys;
    said carrier is made from a die-cast aluminum; and,
    said unitary outer, inner-toothed ring gear is made from injection molded plastic.

7. A planetary gear transmission as described in claim 1 wherein said unitary sun gear, said set planetary discs, said planetary gear rings, said carrier, and said unitary outer, inner-toothed ring gear are made from plastic.

8. A planetary gear transmission as described in claim 1 wherein said unitary sun gear, said planetary gear rings, said unitary outer, innert-toothed ring gear, and said carrier are made from metal.

* * * * *